(12) United States Patent
Plasterer et al.

(10) Patent No.: US 7,177,352 B1
(45) Date of Patent: Feb. 13, 2007

(54) PRE-CURSOR INTER-SYMBOL INTERFERENCE CANCELLATION

(75) Inventors: John Plasterer, Burnaby (CA); Jurgen Hissen, Port Moody (CA); Mathew McAdam, Vancouver (CA); Anthony Eugene Zortea, Pipersville, PA (US); Ognjen Katic, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 94 days.

(21) Appl. No.: 11/146,375

(22) Filed: May 31, 2005

Related U.S. Application Data

(60) Provisional application No. 60/575,603, filed on May 28, 2004.

(51) Int. Cl.
*H03H 7/30* (2006.01)

(52) U.S. Cl. .................................... 375/232
(58) Field of Classification Search ................ 375/229, 375/230, 231, 233, 350; 333/18, 28 R; 708/300, 322, 323
See application file for complete search history.

(56) References Cited

U.S. PATENT DOCUMENTS

| | | | |
|---|---|---|---|
| 3,792,356 A | 2/1974 | Kobayashi et al. | |
| 4,170,758 A | 10/1979 | Tamburelli | |
| 4,283,788 A | 8/1981 | Tamburelli | |
| 4,789,994 A | 12/1988 | Randall et al. | |
| 5,396,519 A * | 3/1995 | Betts et al. ................. | 375/296 |
| 5,539,774 A | 7/1996 | Nobakht et al. | |
| 5,748,674 A | 5/1998 | Lim | |
| 6,167,082 A | 12/2000 | Ling et al. | |
| 6,192,072 B1 | 2/2001 | Azadet et al. | |
| 6,307,884 B1 | 10/2001 | Du et al. | |
| 6,337,878 B1 * | 1/2002 | Endres et al. ............... | 375/229 |
| 6,363,112 B1 * | 3/2002 | Azadet et al. .............. | 375/233 |

(Continued)

FOREIGN PATENT DOCUMENTS

GB 2355639 4/2001

OTHER PUBLICATIONS

Woo et al., "Advance Dual Decision Feedback Equalizer for Perpendicular Magnetic Recording Channel, Magnetic Conference," 2002, INTERMAG Europe 2002, IEEE, pp. GP4.*

(Continued)

*Primary Examiner*—Tesfaldet Bocure
(74) *Attorney, Agent, or Firm*—Knobbe Martens Olson & Bear LLP

(57) ABSTRACT

Methods and apparatus for canceling pre-cursor inter-symbol interference (ISI) are disclosed. In a digital communication system, a significant amount of noise can be attributed to the pre-cursor portion of the ISI. In a receiver, it can be relatively difficult to compensate for pre-cursor ISI in part because pre-cursor ISI is a result of one or more symbols that have yet to arrive at the receiver. One embodiment removes a portion of this ISI by using multiple detection thresholds in parallel. For example, data slicing (generation of a hard decision) can include three thresholds. These thresholds for slicing include a positive offset, a negative offset and no offset. The positive and negative offsets can correspond to the expected pre-cursor component of the data channel for which the data is transmitted or to a fraction thereof. The path with the correctly-compensated ISI is selected later.

37 Claims, 5 Drawing Sheets

U.S. PATENT DOCUMENTS

| | | | |
|---|---|---|---|
| 6,426,972 B1* | 7/2002 | Endres et al. | 375/229 |
| 6,668,014 B1* | 12/2003 | Endres et al. | 375/232 |
| 6,697,423 B1 | 2/2004 | Jin et al. | |
| 6,850,563 B1* | 2/2005 | Hulyalkar et al. | 375/233 |
| 2004/0234002 A1* | 11/2004 | Yang et al. | 375/263 |

OTHER PUBLICATIONS

J. Brown, P. Hurst, Bret Rothenberg, and S. Lewis, "A CMOS Adaptive Continuous-Time Forward Equalizer, LPF, and RAM-DFE for Magnetic Recording," IEEE Journal of Solid-State Circuits, vol. 34, No. 2, Feb. 1999, pp. 162-169.

Y. Kim and H. Lee, "A Decision-Feedback Equalizer with Pattern-Dependent Feedback for Magnetic Recording Channels," IEEE Transactions on Communications, vol. 49, No. 1, Jan. 2001, pp. 9-13.

J. P. Leblanc and S. W. McLaughin, "Enhanced RAM-Based Equilizers for Nonlinear Channels," Conference Record of the Thirty-Second Asilomar Conference on Signals, Systems and Computers (Nov. 1-4, 1997, Pacific Grove, California).

M. E. Austin, "Decision Feedback Equalization for Digital Communication over Dispersive Channels," MIT Research Laboratory of Electronics, Technical Report 461, Aug. 11, 1967.

D. A. George et al., "An Adaptive Decision Feedback Equalizer," IEEE Transactions on Communication Technology, vol. Com-19, No. 3, Jun. 1971, pp. 281-293.

J. Bergmans, J. O. Voorman, and H. W. Wong-Lam, "Dual Decision Feedback Equalizer," IEEE Transactions on Communications, vol. 45, No. 5, May 1997, pp. 514-518.

Ming Jin, K. C. Indukumar, B. Farghang-Boroujeny, and G. Mathew, "Dual FDTS/DF: A Unified Approach to Dual-Detection and Modification for MTR Codes," IEEE Transactions on Magnetics, vol. 37, No. 3, May 2001, pp. 1175-1186.

M. Chiani, "Introducing Erasures in Decision-Feedback Equalization to Reduce Error Propagation" IEEE Transactions Communications, vol. 45, No. 7, Jul. 1997, pp. 757-760.

H. Yoo, S. Ong, C. Kang, and D. Hong, "Prediction Based Direct Blind Decision Feedback Equalization," 2002 IEEE International Conference on Acoustics, Speech and Signal Procession (27th), vol. 3, pp. 2481-2484.

D. Raphaeli and A. Stark, "Partial Imaginary Precursor Cancelling in DFE for BPSK and GMSK Modulations," European Transactions on Telecommunications, vol. 12-6. pp. 461-9, 2001.

* cited by examiner

PRE-CURSOR INTER-SYMBOL INTERFERENCE CANCELLATION

CROSS-REFERENCE TO RELATED APPLICATIONS

This application claims the benefit under 35 U.S.C. § 119(e) of U.S. Provisional Application No. 60/575,603, filed May 28, 2004, the entirety of which is hereby incorporated by reference.

BACKGROUND

1. Field of the Invention

The invention generally relates to high-speed communications devices. In particular, the invention relates to interference compensation techniques in a receiver.

2. Description of the Related Art

A variety of physical impairments can limit the effective transmission of data signals over communications channels. For example, the frequency selective nature of a communication channel attenuates and phase shifts the various frequency components of an input signal differently depending on frequency. A corresponding impulse response can span several symbol intervals, which can result in time smearing and interference between successive transmitted input symbols, which is known as inter-symbol interference (ISI). The ISI resulting from the channel distortion, if left uncompensated, can undesirably result in relatively high error rates. One approach to the ISI problem is to have a receiver compensate or reduce the ISI in the received signal with an equalizer.

Within inter-symbol interference (ISI), there are post-cursor ISI and pre-cursor ISI. Past bits (bits already received) contribute to post-cursor ISI, and future bits (bits yet to be received) contribute to pre-cursor ISI.

A pulse response of the system can be used to show the ISI contributions of a system. A sample of such a pulse response is shown in FIG. 1. The pre-cursor portion 102 of the pulse response contributes to the pre-cursor ISI of earlier-in-time symbols, and the post-cursor portion 104 of the pulse response contributes to post-cursor ISI of later-in-time symbols.

A number of techniques exist to reduce the ISI of a system. A common approach to this problem is a decision feedback equalizer (DFE). Within this disclosure, a DFE refers to the feedback portion of a decision-based equalization scheme and does not include feed-forward filtering.

A typical DFE operates by determining the symbols or bits incoming data signal and using the determined symbols or bits bit multiplied by an adapted gain factor (such as in a finite impulse response filter) to cancel out the post-cursor ISI of a channel. Since a conventional DFE only has access to observed data bits and not to future data bits, a conventional DFE is unable to compensate for the pre-cursor contribution of ISI.

However, the pre-cursor contribution of ISI of a channel can have a significant impact on the error performance of the channel. Accordingly, it is desirable to reduce the overall pre-cursor noise contribution.

As illustrated in FIG. 2, a traditional approach to removing pre-cursor ISI is to use a feed-forward equalizer 202. A feed-forward equalizer 202 combined with a decision feedback equalizer (DFE) 204 reduces the pre-cursor ISI and the post-cursor ISI. With this system, the signal is passed first through a feed-forward equalizer 202 that typically includes the cancellation of the pre-cursor ISI contributions. The signal is then sent through the DFE 204, which removes the post-cursor portion of the noise.

There are a number of disadvantages associated with a feed-forward equalizer approach. A linear feed-forward equalizer that is adaptive can be difficult to implement in practice for high-speed implementations. An adaptive filter is typically desirable since the characteristics of a transmission medium can change over time. Another typical disadvantage with feed-forward equalizers is that the equalization applied to reduce the ISI is also applied to cross-talk and other noise sources. This is undesirable, since the noise can be amplified by the equalization process.

Pre-cursor ISI can also be reduced from the transmitting end of the communication system. The pre-cursor ISI can be reduced by manipulating the transmitted pulse to compensate for the distortions of the channel. This technique is known as pre-cursor pre-emphasis and is illustrated in FIG. 3. FIG. 3 illustrates a transmitted pulse for a system that compensates in the transmitter for pre-cursor ISI. One disadvantage is that the magnitude of the compensation that should be used is not known to the transmitter by itself. To make that a pre-cursor pre-emphasis system adaptable, a provision for a return communication path from the receiver and transmitter must be provided so that the channel response as observed by the receiver can be provided to the transmitter.

Another conventional approach is illustrated in U.S. Pat. No. 6,697,423 for the reduction of pre-cursor ISI in a 4-PAM or 2 Binary 1 Quaternary (2B1Q) system.

A dual DFE is another example of a conventional approach. In a dual-DFE approach, multiple decision feedback equalizers are used in parallel.

SUMMARY OF THE INVENTION

Methods and apparatus for canceling pre-cursor inter-symbol interference (ISI) are disclosed. In a digital communication system, a significant amount of noise can be attributed to the pre-cursor portion of the ISI. It will be understood that in a high-speed digital communication system, the signals in the communication channel have attributes of both analog and digital, and will be referred to herein as "analog." In a receiver, such as a receiver of a serializer/deserializer (SerDes), it can be relatively difficult to compensate for pre-cursor ISI in part because pre-cursor ISI is a result of symbols that have yet to arrive at the receiver. One embodiment removes a portion of this ISI by using multiple detection thresholds in parallel. For example, data slicing (generation of a hard decision) can include three thresholds. These thresholds for slicing include a positive offset, a negative offset and no offset. The positive and negative offsets can correspond to the expected pre-cursor component of the data channel for which the data is transmitted or to a fraction thereof. The correct path with the compensated ISI is selected later.

One embodiment includes a method of compensating for pre-cursor inter-symbol interference (ISI) in an input signal, where the input signal carries data symbols, where the method includes: generating a first adjusted version of the input signal in real time, said first adjusted version of the input signal compensating for pre-cursor ISI originating from a subsequent symbol of the input signal when a state of the subsequent symbol corresponds to a first state; generating a second adjusted version of the input signal in parallel with generating the first adjusted version, said second adjusted version compensating for pre-cursor ISI originating from the subsequent symbol of the input signal when the state of the subsequent symbol corresponds to a second state; generating a first hard decision output from the first adjusted version of the input signal; generating a second hard decision output from the second adjusted version of the input signal; and selecting an output symbol originating from the first hard decision output or the second hard decision output as a pre-cursor ISI-compensated output symbol.

One embodiment includes a method of canceling pre-cursor inter-symbol interference (ISI) in a signal carrying data symbols, where the method includes: compensating for pre-cursor ISI in a received signal before ascertaining a logical state of a later-in-time symbol corresponding to the pre-cursor ISI by compensating for pre-cursor ISI for multiple possible logical states of the later-in-time symbol in separate data paths; determining the logical state of the later-in-time symbol; and selecting the data path corresponding to the determined logical state of the later-in-time symbol.

One embodiment includes a circuit for compensating for pre-cursor inter-symbol interference (ISI) in a signal carrying data symbols, where the circuit includes: at least a first data processing path and a second data processing path, where the first data processing path and the second data processing path are each coupled directly or indirectly to the signal, where the first data processing path is configured to apply a positive offset to the signal to generate a first pre-cursor ISI compensated data symbol, and where the second data processing path is configured to apply a negative offset to the signal to generate a second pre-cursor ISI compensated data symbol; and a selection circuit in communication with the first data processing path and with the second data processing path, where the selection circuit is configured to select among at least the first pre-cursor ISI compensated data symbol or the second pre-cursor ISI compensated data symbol for an output symbol compensated for pre-cursor ISI.

One embodiment includes a circuit for compensating for pre-cursor inter-symbol interference (ISI) in an input signal, where the input signal carries data symbols, where the circuit includes: means for generating a first adjusted version of the input signal in real time, said first adjusted version compensating for pre-cursor ISI originating from a subsequent symbol of the input signal when a state of the subsequent symbol corresponds to a first state; means for generating a second adjusted version of the input signal, said second adjusted version compensating for pre-cursor ISI originating from the subsequent symbol of the input signal when the state of the subsequent symbol corresponds to a second state; means for generating a first hard decision output from the first adjusted version of the input signal; means for generating a second hard decision output from the second adjusted version of the input signal; and means for selecting the first hard decision output or the second hard decision output as a pre-cursor ISI-compensated output symbol.

One embodiment includes a circuit for canceling pre-cursor inter-symbol interference (ISI) in a signal carrying data symbols, where the circuit includes: means for compensating for pre-cursor ISI in a received signal before ascertaining a logical state of a later-in-time symbol corresponding to the pre-cursor ISI by compensating for pre-cursor ISI for multiple possible logical states of the later-in-time symbol in separate data paths; means for determining the logical state of the later-in-time symbol; and means for selecting the data path corresponding to the determined logical state of the later-in-time symbol.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Specific embodiments of a pre-cursor ISI compensation circuit will now be described that advantageously improve the error rate of a digital communication system. These embodiments can be used in high-speed communication systems that use non-return to zero (NRZ) signaling, and are also applicable to other areas, such as magnetic drive reading and multi-level coded signals. Selected embodiments can be implemented with relatively low cost, as the high-speed analog-to-digital converters of conventional feed-forward equalizers is not needed in all embodiments.

Although particular embodiments are described herein, other embodiments of the invention, including embodiments that do not provide all of the benefits and features set forth herein, will be apparent to those of ordinary skill in the art.

Figure 1:
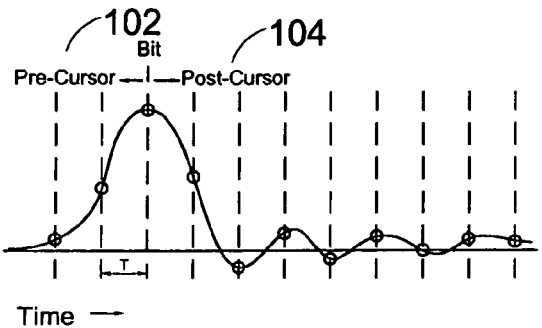
FIG. 1 illustrates an example of a pulse response.
Figure 2:
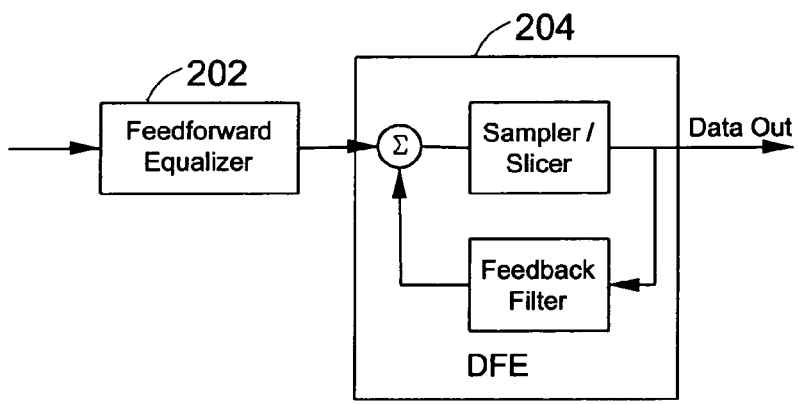
FIG. 2 illustrates a conventional technique for pre-cursor ISI cancellation.
Figure 3:
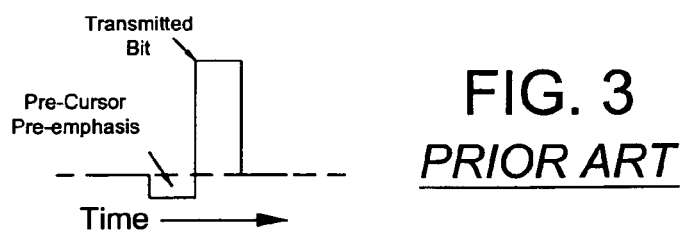
FIG. 3 illustrates a pre-cursor pre-emphasis technique.
Figure 4:
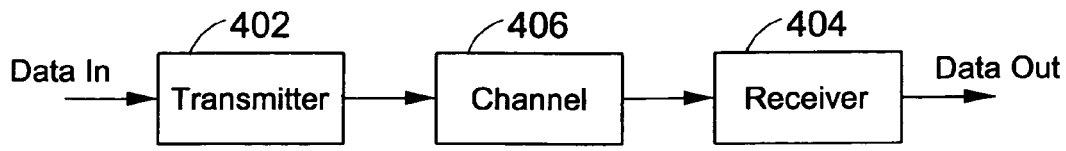
FIG. 4 illustrates a model of a digital communication system.

FIG. 4 illustrates a typical NRZ communication between two communicating systems. In the illustrated system, which includes a transmitter 402, a receiver 404, and a communication channel 406, the communication channel 406 introduces distortions that are desirably reduced by the transmitter 402 or by the receiver 404. The receiver 404 can be embodied in a wide variety of data communication devices, such as a serializer/deserializer (SerDes)

Pre-cursor ISI can be a significant contributor to the overall noise of the system. Typically, only the first pre-cursor component contributes significantly to the overall noise of the system. Accordingly, effective pre-cursor ISI cancellation can be implemented by compensating for the pre-cursor ISI of the nearest future bit or symbol.

Figure 5:
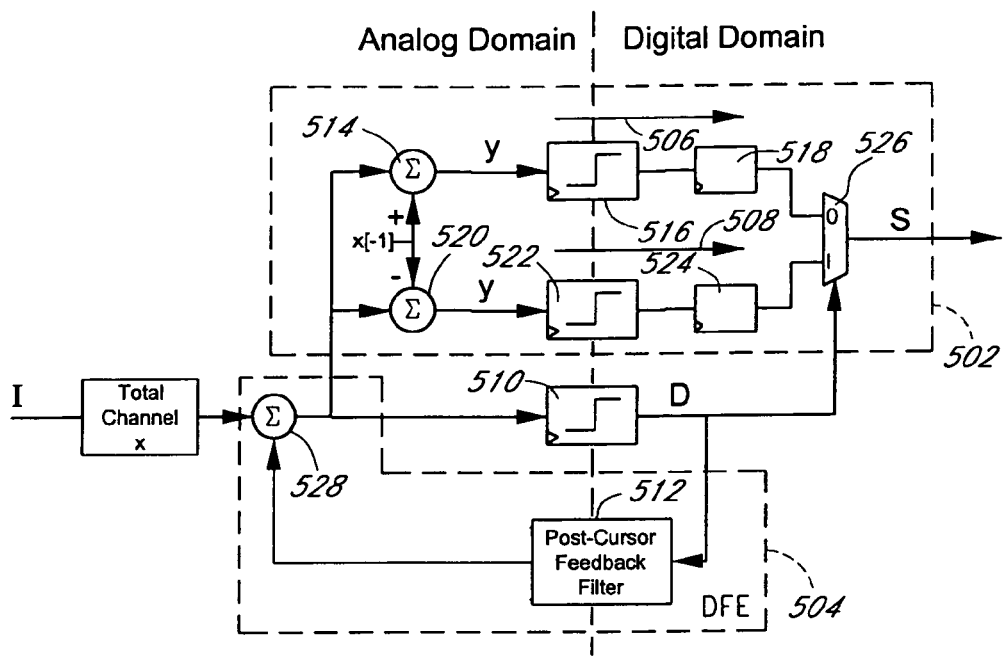
FIG. 5 illustrates an embodiment of a circuit for compensating for pre-cursor inter-symbol interference (ISI) and also illustrates an optional decision feedback equalizer (DFE).

FIG. 5 illustrates an embodiment of a circuit 502 for compensating for pre-cursor inter-symbol interference (ISI) and also illustrates an optional decision feedback equalizer (DFE) 504. The circuit 502 can be used with or without the DFE 504. With both the circuit 502 and the DFE 504, the circuits can compensate for both pre-cursor ISI and post-cursor ISI. With only the circuit 502, the circuit 502 compensates only for the pre-cursor ISI.

The illustrated embodiment uses multiple thresholds in order to accommodate the possible values of the incoming data. At the time of the sampling, only the current and past bit or symbol information is available, so that all possible combinations of future bits should be accommodated. In the illustrated NRZ system, a first data processing path 506 and a second data processing path 508 are used to accommodate the two possible symbols, logically, "0" and "1," which are also referred to as "−1" and "1," with reference to the communication channel in NRZ. In the illustrated embodiments except for the embodiment of FIG. 10, the sampling is performed within the slicer circuits, which also generate a hard decision output. An input to a slicer can be considered analog, and the output of the slicer is a digital symbol. When the next bit in the sequence is determined, the determination can be used to select which one of the offset sliced data is appropriate to use.

One embodiment illustrated in FIG. 5 includes the optional DFE 504 and two offset data processing paths 506, 508. The initial DFE 504, including feedback filter 512 and a summing circuit 528, reduces the post-cursor contributions of noise and decreases sampling errors. The two offset data processing paths 506, 508 slice the input data with the two possible ISI contributions of the next bit, which is unknown at the time of slicing.

For example, the first data processing path 506 includes a summing circuit 514, a slicer 516, and a delay circuit 518. The delay circuit 518 can be implemented by a D-type flip flop. The second data processing path 508 includes a summing circuit 520, a slicer 522, and a delay circuit 524. Outputs of the first data processing path 506 and the second data processing path 508 are selected by a selection circuit. In the illustrated embodiment, the selection circuit corresponds to a multiplexer 526. Other data selection circuits can be used, such as the data selection circuit that will be described later in connection with FIG. 8.

Operation of the circuit 502 and the optional DFE 504 will now be described. The data is sent by a transmitting device to input I. A transmission channel distorts the corresponding signal, represented by a box labeled "Total Channel x," and an analog summer 528 is used to sum in a filtered signal for the post-cursor DFE 504. For example, the post-cursor feedback filter 512 can be implemented by a finite impulse response (FIR) filter.

After the summer 528, the signal is provided to three processing paths in the illustrated embodiment. The two offset slicers 516, 522 slice the signal with a positive and negative offset, as provided by the summing circuit 514 and the summing circuit 520. In the illustrated embodiment, a relatively constant voltage offset x[−1] is used by the summing circuits 514, 520. In one embodiment, one of the summing circuits 514, 520 adds and the other subtracts the voltage offset x[−1]. As will be discussed later in connection with FIG. 7, the voltage offset x[−1] can be adaptively determined. The voltage offset x[−1] can also be predetermined. In one embodiment, the offsets for each offset data processing path 506, 508 are integrated with the thresholds of the slicers 16, 522. In addition, where differential circuits are used, it will be understood that both the positive and negative phases of a signal will typically be available by inverting differential inputs or outputs. This property can be used when summing signals in phase to add, and out of phase to subtract. A "main" path with a slicer 510 slices the data with zero or no offset. In the illustrated embodiment, an output of the slicer 510 is also used by the optional DFE 504 (when present).

The detected bits (symbols) from slicers 516, 522 are delayed by one bit cycle or symbol cycle by the delay circuits 518, 524. This provides time for the circuit 502 to capture the next data bit in the slicer 510. The next data bit is then used to determine which one of the offset data processing paths 506, 508 corresponds to the correctly-offset data. In the illustrated embodiment, the output of the slicer 510 is provided as an input to the multiplexer 526 to select the correctly offset data. When the symbol detected by the slicer 510 is a "0," ("−1" in NRZ) the multiplexer 526 selects the upper data processing path 506. When the symbol detected by the slicer 510 is a "1," the multiplexer 526 selects the lower data processing path 508.

Figure 8:
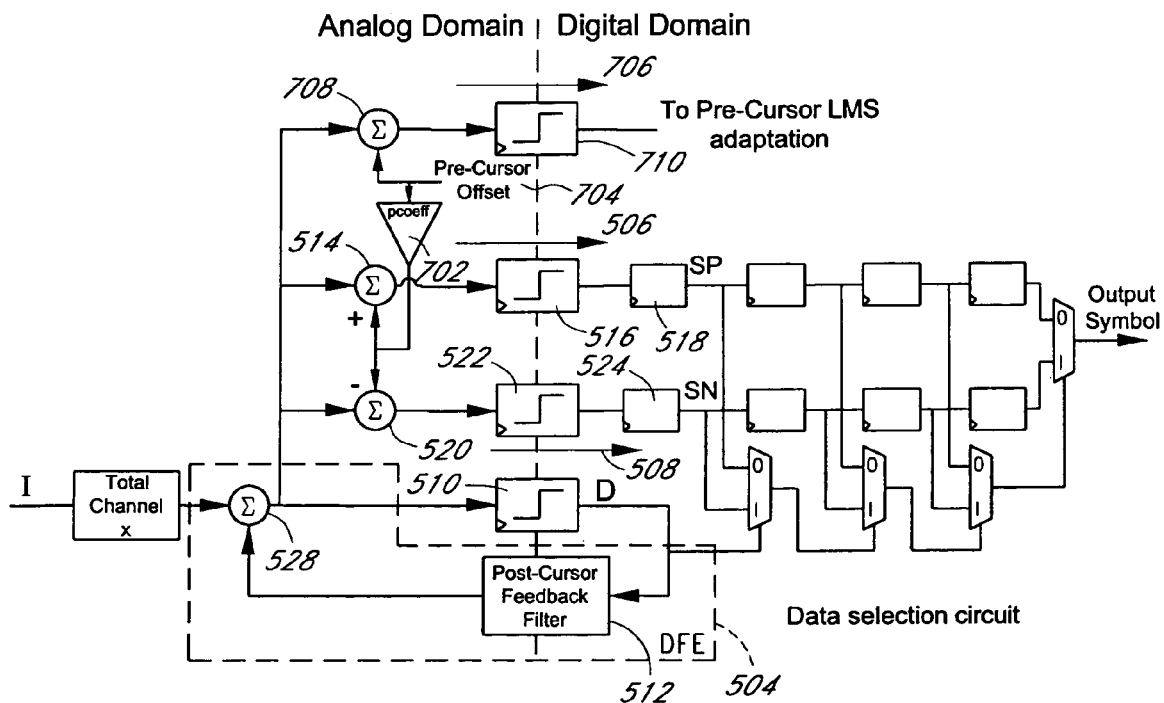
FIG. 8 illustrates an embodiment of a circuit for compensating for pre-cursor inter-symbol interference (ISI), where one or more subsequent symbols can be used in selecting an output symbol.

It should be noted that the symbol used to decide the correct offset path (the output of the slicer 510 for the embodiment illustrated in FIG. 5) is subject to the same pre-cursor ISI distortions as the previous data compensated by the data processing paths 506, 508. The pre-cursor error of the next bit increases the probability that the current sample will be incorrectly selected. Further, if the main path has made an incorrect decision on an ambiguous sample, the first post-cursor contribution from the DFE 504 will be incorrect and will increase the chance that an error is made on the next bit. One embodiment described in greater detail in connection with FIG. 8 provides an example of a more robust technique to select one of the offset data processing paths 506, 508.

Since there is a finite chance that the next bit is determined with error, the overall improvement in error rate is not as good as the ideal case. It can be shown, however, that an improvement in performance is attained even if only a portion of the pre-cursor ISI is canceled.

The overall bit error rate improvement of the system can be analyzed to show that it has significant improvements in performance. The system can be analyzed to determine the error rate improvement when full magnitude correction of pre-cursor ISI is performed.

The error rate of the system is not that of a perfectly cancelled pre-cursor. In order to examine the error of the system, the following analysis assumes that the noise of the system is Gaussian. Further, in order to simplify error propagation, the following analysis assumes that the error propagation beyond the first post-cursor timing interval is not significant. For many systems, these assumptions will hold true, however, further analysis of error propagation effects should be performed in situation where the assumption does not hold.

When a DFE is used to correct for post-cursor error, the error propagation of the system should also be taken into account. For example, if there is an error on sample D[k−1], there can be a significant increase of an error on sample D[k] since the DFE post-cursor correction will be applied in the wrong direction.

For the analysis, a number of error probabilities for the system are defined. For a system at time k, the following are defined:

$P(E_S[k])$—The probability that there is an error on S[k]

$P(E_D[k])$—The probability that there is an error on D[k]

$P(!E_D[k])$—The probability that there is no error on D[k]

$P(E_{POST})$—The probability of error for a system with only post-cursor equalization.

$P(E_{POST+PRE})$—The probability of error for a system with perfect pre-cursor and post-cursor cancellation P($E_{POST-PRE}$)—The probability of error for a system with perfect post-cursor cancellation but twice the pre-cursor error. This applies when an incorrect bit is chosen that effectively doubles pre-cursor ISI.

P($E_{-POST}$)—The probability of error for a system with twice the first post-cursor impulse error and no pre-cursor cancellation. This implies that an incorrect bit is chosen that effectively doubles the post-cursor error.

Since the main path with node "D" only has post-cursor cancellation, the expression of Equation 1 is true:

$$P(E_D[k]) = P(E_{POST}) \quad \text{Equation 1}$$

With these definitions, the error with respect to two different regions can be defined, when D[k−1] is correct and when D[k−1] is incorrect as expressed in Equation 2.

$$P(E_S[k]) = P(E_S[k]|E_D[k-1])*P(E_D[k-1]) + P(E_S[k]|!E_D[k-1])*P(!E_D[k-1]) \quad \text{Equation 2}$$

For the case of no error on D[k−1], Equation 3 applies.

$$P(E_S[k]|!E_D[k-1]) = P(E_S[k]|(E_D[k]|!E_D[k-1]))*P(E_D[k]|!E_D[k-1]) + P(E_S[k]|(!E_D[k]|!E_D[k-1]))*P(!E_D[k]|!E_D[k-1]) \quad \text{Equation 3}$$

Since the probability of an error of most systems is very small then, Equations 4 and 5 apply.

$$P(E_D[k]|!E_D[k-1]) \cong P(E_D[k]) \quad \text{Equation 4}$$

and $$P(!E_D[k]|!E_D[k-1]) \cong 1 \quad \text{Equation 5}$$

If there is no error on D[k] and D[k−1], and the offset is set to the first pre-cursor component, then in that condition, the error rate is equal to that of ideal pre-cursor cancellation as expressed in Equation 6.

$$P(E_S[k]|(!E_D[k]|!E_D[k-1])) = P(E_{POST+PRE}) \quad \text{Equation 6}$$

If however, an error is present on D[k], then the noise should be less than that of twice the pre-cursor value in order to make sure that there is no ambiguity on the previous data bit as expressed in Equation 7.

$$P(E_S[k]|(E_D[k]|!E_D[k-1])) = P(E_{POST-PRE}) \quad \text{Equation 7}$$

If Equation 1, Equation 4, Equation 5, Equation 6, and Equation 7 are combined into Equation 3, Equation 8 results.

$$P(E_S[k]|!E_D[k-1]) \cong P(E_{POST+PRE}) + P(E_{POST-PRE}) \cdot P(E_{POST}) \quad \text{Equation 8}$$

Notice from Equation 8 that if P($E_{POST-PRE}$) is relatively high, then that term could dominate the ideal pre-cursor cancellation.

Now, if the case of an error on D[k−1] is examined, there is a similar equation to Equation 3 as expressed in Equation 9.

$$P(E_S[k]|E_D[k-1]) = P(E_S[k]|(E_D[k]|E_D[k-1]))*P(E_D[k]|E_D[k-1]) + P(E_S[k]|(!E_D[k]|E_D[k-1]))*P(!E_D[k]|E_D[k-1]) \quad \text{Equation 9}$$

When there is an error on D[k−1], then the chance of an error on D[k] is significantly higher due to the doubling of the post-cursor component. When this is taken into account, and the fact that the error rate of the system is already relatively low, the result expressed in Equations 10 and 11 are achieved.

$$P(E_D[k]|E_D[k-1]) \cong P(E_{-POST}) \quad \text{Equation 10}$$

and $$P(!E_D[k]|E_D[k-1]) \cong (1 - E_{-POST}) \quad \text{Equation 11}$$

When there is an error on D[k], and D[k−1] is also incorrect, then an error will be made unless the noise could overcome twice the post cursor as expressed in Equation 12.

$$P(E_S[k]|(E_D[k]|E_D[k-1])) = 1 - P(E_{-PRE}) \cong 1 \quad \text{Equation 12}$$

If however, D[k] is correct then the pre-cursor cancellation will work the same as an ideal pre-cursor cancellation system and thus the relationship expressed by Equation 13 results.

$$P(E_S[k]|(!E_D[k]|E_D[k-1])) \cong P(E_{POST+PRE}) \quad \text{Equation 13}$$

Combining Equation 10, Equation 11, Equation 12 and Equation 13 into Equation 9 results in the expression of Equation 14.

$$P(E_S[k]|E_D[k-1]) \cong P(E_{-POST}) + (1 - P(E_{-POST})) \cdot P(E_{POST+PRE}) \quad \text{Equation 14}$$

Note that for a relatively small P($E_{POST+PRE}$), the Equation 14 simplifies to Equation 15.

$$P(E_S[k]|E_D[k-1]) \cong P(E_{-POST}) + P(E_{POST+PRE}) \quad \text{Equation 15}$$

Combining now Equation 8 and Equation 15 into Equation 2 results in Equation 16.

$$P(E_S[k]) \cong P(E_{POST+PRE}) + P(E_{POST+PRE}) \cdot P(E_{POST}) \cdot P(!E_D[k-1]) + (P(E_{-POST}) + P(E_{POST+PRE})) \cdot P(E_D[k-1]) \quad \text{Equation 16}$$

Equation 16 can be simplified if it is assumed that the probability of a correct answer is approximately 1. This results in Equation 17.

$$P(E_S[k]) \cong P(E_{POST+PRE}) + P(E_{POST+PRE}) \cdot P(E_{POST}) + (P(E_{-POST}) + P(E_{POST+PRE})) \cdot P(E_{POST}) \quad \text{Equation 17}$$

The relationship expressed by Equation 18 should also be noted.

$$P(E_{POST+PRE}) \cdot P(E_{POST}) \cong 0 \quad \text{Equation 18}$$

Taking the relationship expressed in Equation 18 into consideration, the overall error rate can be approximated by Equation 19.

$$P(E_S[k]) \cong P(E_{POST+PRE}) + P(E_{POST-PRE}) \cdot P(E_{POST}) + P(E_{-POST}) \cdot P(E_{POST}) \quad \text{Equation 19}$$

Equation 19 reveals that the BER of the overall system can advantageously be further improved when correction of less than all of the pre-cursor ISI is implemented. This is an unexpected result to those skilled in the art. If P($E_{POST}$) is fixed, then P($E_{POST-PRE}$) can be reduced by decreasing the amount of pre-cursor cancellation to the point that the error rate is minimized. Note, however, that the system may still be dominated by P($E_{-POST}$) if the first post-cursor component is large.

Figure 6:
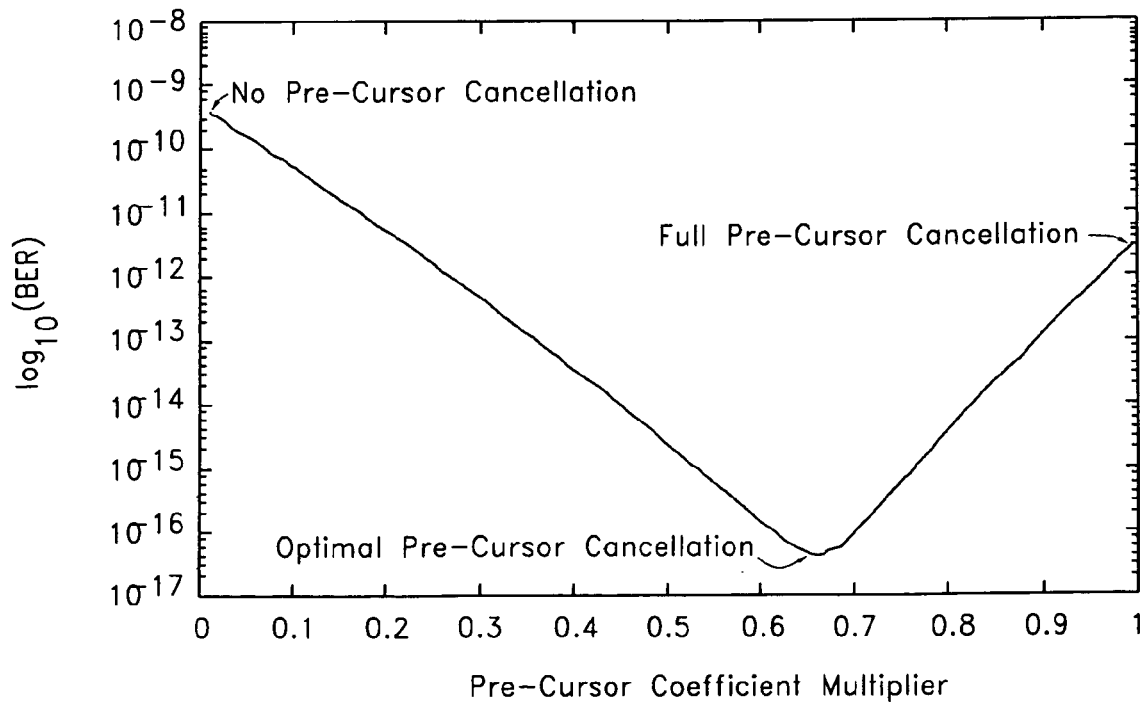
FIG. 6 illustrates a chart of a simulation of a bit error rate (BER) with a fractional pre-cursor coefficient.

FIG. 6 illustrates a simulation of the bit error rate (BER) for a sampled system that is not dominated by post-cursor ISI. The pre-cursor coefficient is multiplied or scaled by a fraction with a value between 0 and 1. This advantageously lowers the BER. For example, such scaling can be accomplished a voltage divider, by a separate output of a digital-to-analog converter, and the like.

As illustrated by the simulation of FIG. 6, there is an optimal value for the pre-cursor around half of its full "on" value. Note that FIG. 6 illustrates about 2 orders of magnitude advantage going from no pre-cursor coefficient to full pre-cursor coefficient; and about an additional 4.5 orders of magnitude advantage when the coefficient is optimized.

Figure 7:
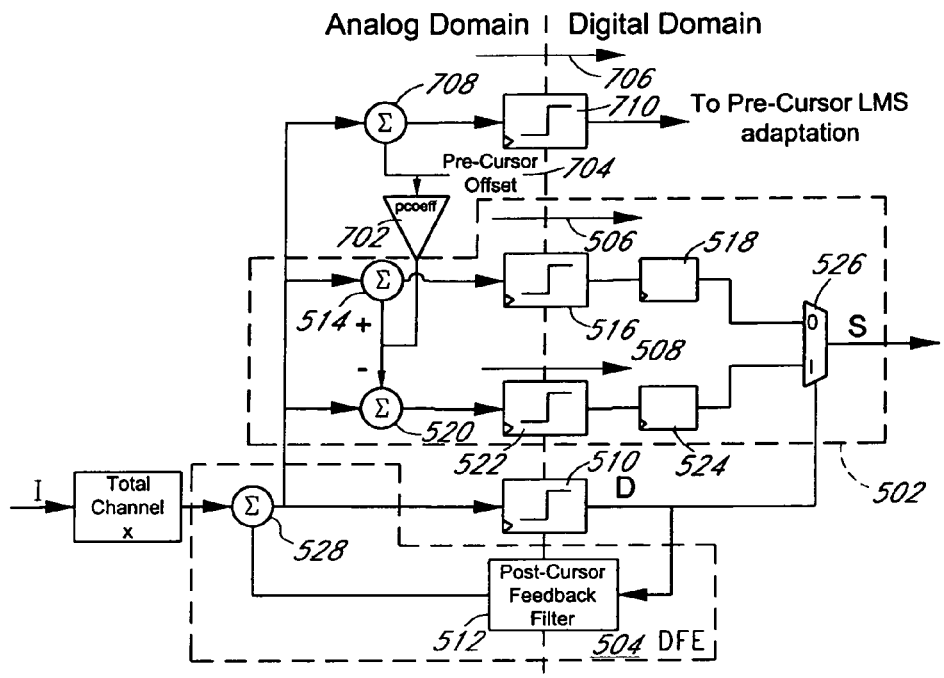
FIG. 7 illustrates an embodiment of a circuit for compensating for pre-cursor inter-symbol interference (ISI) with an interface for adaptive updates.

FIG. 7 illustrates an embodiment of a circuit for compensating for pre-cursor inter-symbol interference (ISI) with an interface for adaptive updates. Note that the pre-cursor offset can be adapted by allowing the full pre-cursor offset coefficient during training, then reducing the pre-cursor offset coefficient to the optimal value when training is complete.

In the illustrated embodiment, the pre-cursor offset coefficient 704 used by the circuit is intentionally degraded by the pcoeff factor by a scaling block 702. Of course, a separate output with a fraction of the full pre-cursor offset coefficient 704 can also be used. In the illustrated embodiment, the signal (output of summer 528 when the DFE 504 is present) is further processed by a adaptation path 706 with a pre-cursor offset 704 for adaptation. In order to provide adaptation while in operation and provide a fractionally scaled (by pcoefj) offset for the data processing paths 506, 508, the adaptation path 706 should be separate from the data processing paths 506, 508. In the illustrated embodiment, the adaptation path 706 includes a summing circuit 708 and a slicer 710.

The pre-cursor offset coefficient 704 can be found in many different ways, and the techniques used for DFE coefficient adaptation can be reused for the adaptation of the pre-cursor coefficients. In one embodiment, adaptation of the pre-cursor offset coefficient 704 uses a least means squared (LMS) algorithm.

In one example, the determined pre-cursor offset coefficient $c_{-1}$ is scaled by fraction pcoeff 702 to provide improved BER performance, while the LMS algorithm tracks the value of the pre-cursor offset coefficient 704. Notice that in this example, the adaptation is gated by the positive decisions, i.e., the update is happening only during +1. However, the equivalent model can be also obtained during −1 intervals as well, which would increase the speed of adaptation if desired.

The following describes one example of adaptation.

The channel pulse response can be defined by Equation 20.

$$\vec{h} = [h_{-1} h_0 h_1 h_2]^T \qquad \text{Equation 20}$$

In this channel example, there is one pre-cursor component $h_{-1}$ and two post-cursors $h_1$ and $h_2$, while the reference tap is $h_0$ (it is usually normalized to 1 when the system has an automatic gain control (AGC)). Although the theory presented in the following text is based on the simple model of Equation 20, it can be generalized to any number of post-cursors.

The information sequence be defined as expressed in Equation 21.

$$\vec{I} = [I_0 I_1 \ldots I_k \ldots ]^T \qquad \text{Equation 21}$$

Values of vector $\vec{I}$ may be +1 or −1 for representing bits 1 and 0 respectively (antipodal signaling).

The received signal may be written as a sum of the desired symbol and the corresponding error.

$$x_k = h_0 \cdot I_k + e_k \qquad \text{Equation 22}$$

In Equation 22, error $e_k$ is expressed by Equation 23.

$$e_k = h_{-1} \cdot I_{k+1} + h_1 \cdot I_{k-1} + h_2 \cdot I_{k-2} \qquad \text{Equation 23}$$

Equation 24 describes the desired LMS adaptation of the algorithm without the sign non-linearity:

$$c_{-1}(k+1) = c_{-1}(k) + \mu \cdot \epsilon_{k-1} \cdot I_k \qquad \text{Equation 24}$$

Variable $c_{-1}(k)$ represents the offset value at time instant k. In one embodiment, $c_{-1}(k)$ is equal to $h_{-1}$. Variable $\mu$ represents the weighted adjustment to the pre-cursor offset coefficient 704 for each adjustment. After each bit, a decision is made to either increase or decrease the pre-cursor offset coefficient 704 coefficient by $\mu$. $I_k$ is a decision at time k and $\epsilon_{k-1}$ is an error at time k−1 given by Equation 25.

$$\epsilon_{k-1} = h_0 \cdot I_{k-1} + e_{k-1} + c_{-1}(k-1) - I_{k-1} \cdot h_0 \qquad \text{Equation 25}$$

Substituting Equation 23 and Equation 24 into Equation 25 and letting $h_0 = 1$, Equation 26 results.

$$c_{-1}(k+1) = c_{-1}(k) + \mu \cdot (h_{-1} \cdot I_k + h_0 \cdot I_{k-1} + h_1 \cdot I_{k+2} + h_2 \cdot I_{k-3} + c_{-1}(k-1) - I_{k-1}) \cdot I_k = c_{-1}(k) + \mu \cdot (h_{-1} I_k^2 + c_{-1}(k-1) \cdot I_k + h_1 \cdot I_{k-2} I_k + h_2 \cdot I_{k-3} \cdot I_k) = c_{-1}(k) + \mu \cdot (h_{-1} + c_{-1}(k-1) \cdot I_k + h_1 \cdot I_{k-2} \cdot I_k + h_2 \cdot I_{k-3} \cdot I_k) \qquad \text{Equation 26}$$

As the illustrated adaptation is gated by the decisions, i.e., it is done only during one type of decision (positive or negative), Equation 26 may be partitioned into the following two algorithms represented by Equations 27 and 28:

$$c_{-1}(k+1) = c_{-1}(k) + \mu \cdot (h_{-1} + c_{-1}(k-1) \cdot (+1) + h_1 \cdot I_{k-2} \cdot (+1) + h_2 \cdot I_{k-3} \cdot (+1)) = c_{-1}(k) + \mu \cdot (h_{-1} + c_{-1}(k-1) + h_1 \cdot I_{k-2} + h_2 \cdot I_{k-3}) = \qquad \text{Equation 27}$$

$$c_{-1}(k+1) = c_{-1}(k) + \mu \cdot (h_{-1} + c_{-1}(k-1) \cdot (-1) + h_1 \cdot I_{k-2} \cdot (-1) + h_2 \cdot I_{k-3} \cdot (-1)) = c_{-1}(k) + \mu \cdot (h_{-1} - c_{-1}(k-1) + h_1 \cdot I_{k-2} - h_2 \cdot I_{k-3}) = \qquad \text{Equation 28}$$

Any of Equations 27 or 28 can be used for the LMS adaptation or they can be combined to produce faster convergence. It should be noted that fast convergence is typically not important as channel conditions change relatively slowly.

As a binary random source is used in the transmitter ($I_k$ may take values of +1 or −1 for NRZ) and letting k→∞, the third and fourth terms inside the braces may be discarded as they will average to 0. Then, the expression for $c_{-1} = c_{-1}(\infty)$ becomes:

$$c_{-1} = c_{-1} + \mu \cdot (h_{-1} + c_{-1}) \qquad \text{Equation 29}$$

From Equation 29, it is evident that the algorithm converges to the desired value of the pre-cursor component $h_{-1}$ (with the changed sign).

Note that a signed LMS algorithm (used for the illustrated implementation) will also converge to the same stable value (as the LMS algorithm presented in the previous text) because it has the same direction of the correction terms.

Further, if constant adaptation is not required, the adaptation algorithm can simply adapt to the pre-cursor tap value of the pulse response during an initial training sequence. Then, that value could be scaled and fixed for the duration of the data acquisition. This approach would simplify the implementation and may be desirable in certain applications.

A number of additional embodiments will now be described. FIG. 8 illustrates an embodiment of a circuit for compensating for pre-cursor inter-symbol interference (ISI), where one or more subsequent symbols can be used in selecting an output symbol.

In the illustrated embodiment, selection of the appropriate data bit can be delayed a certain amount of time until an unambiguous answer is available (i.e. SP=SN). For example, if a 4 cycle delay were used, and if an unambiguous answer was available within 4 cycles, then a more reliable answer will be available. It should be noted that it is not necessary to test for an unambiguous condition as illustrated by FIG. 8.

In the FIG. 8, a 4-delay stage circuit is illustrated. While illustrated with 4 delay stages, it should be noted that an "n" stage pre-cursor cancellation circuit can be used, where n is at least 2. In addition, selected glue logic components, such as latches to prevent glitches during gate transitions, are not shown but will be readily understood by one of ordinary skill in the art. The "n" stages represent the number of clock cycles of delay in which to wait for an unambiguous result.

Conceptually, the circuit works as follows. Let $SP_1$ through $SP_n$ represent the values of the n stages in the chain. Where $SP_1$ represents the most recent sample and $SP_n$ represents the oldest sample. Similarily, $SN_1$ through $SN_n$ represent the earliest to oldest samples of the negative offset sampled input. $D_1$ represents the most recent zero offset sample, and $D_n$ represents the oldest zero offset sample.

For the sake of example, the pipe starts with all ambiguous samples resolved. For unambiguous samples (SP=SN) the correct data bit is simple SP. When an ambiguous sample arrives (SP not equal to SN), an ambiguity needs to be resolved. In order to determine the next bit a single cycle delay is used to determine if the next bit is also ambiguous. After the single cycle delay, the ambiguous samples are now $SP_2$ and $SN_2$. If the samples $SP_1$ and $SN_1$, the next data bit are unambiguous then the selection of the correct sample is determined by $D_2$, since $D_2$ is assumed to have the correct result.

However, if $SP_1$ and $SN_1$ are still ambiguous, the data is delayed for another clock cycle. This process continues until either an unambiguous result is obtained or the end of the pipe is reached. If an unambiguous result is obtained the result is used to correct all forward samples of the pre-cursor DFE pipe. If the end of the pipe is reached (i.e. $SP_n$ and $SN_n$ are ambiguous as well as $SP_1$ and $SN_1$) then $D_1$ is used to determine the correct result.

The cascaded approach further enhances the overall bit error rate by increasing the amount of time to wait for a well defined result. As described earlier, the incorrect decisions on the main path can have an adverse effect on the correction of the DFE 512. This occurs because if the zero offset path (through slicer 510) makes an incorrect decision, the DFE 512 will feed back an incorrect first post-cursor cancellation component. The incorrect first post-cursor tap will increase the probability of an unambiguous incorrect result.

Figure 9:
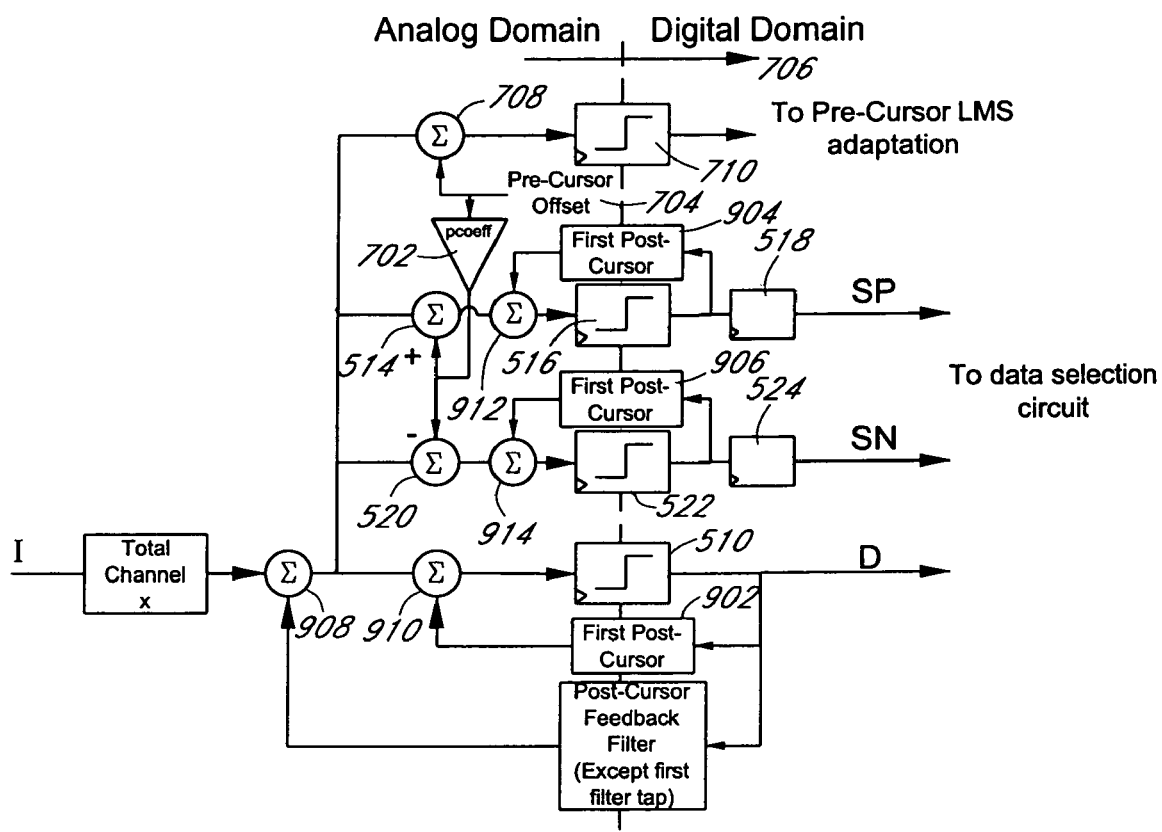
FIG. 9 illustrates an embodiment of a circuit for compensating for pre-cursor inter-symbol interference (ISI).

FIG. 9 illustrates an embodiment of a circuit for compensating for pre-cursor inter-symbol interference (ISI). The illustrated embodiment can reduce the error propagation issue from the first post-cursor tap when an incorrect symbol is determined.

In this implementation, the first post-cursor tap 902, 904, 906 is separated for the main path and the two offset paths. Corresponding summing circuits 908, 910, 912, 914 are separated to isolate the first post-cursor compensation contributions. The purpose of the separation is to reduce the chances of an incorrect unambiguous result. This is achieved through the fact that when an ambiguous bit is detected (SP not equal to SN) one of the two pre-cursor offset paths will have the correct first post-cursor compensation. Therefore, if the noise on the next bit is more than the signal minus the first post cursor minus the first pre-cursor, the data will remain ambiguous.

The technique for choosing the correct data sample can be the same as that described earlier in connection with FIG. 8. The number of stages used to detect the correct value can vary in a very broad range and can depend on environmental factors for which an embodiment is intended for use.

The embodiment illustrated in FIG. 9 can exhibit a relatively good error rate. In one embodiment, the error rates approach that of the ideal DFE, and a corresponding optimal value of pcoeff can approach 1.

Figure 10:
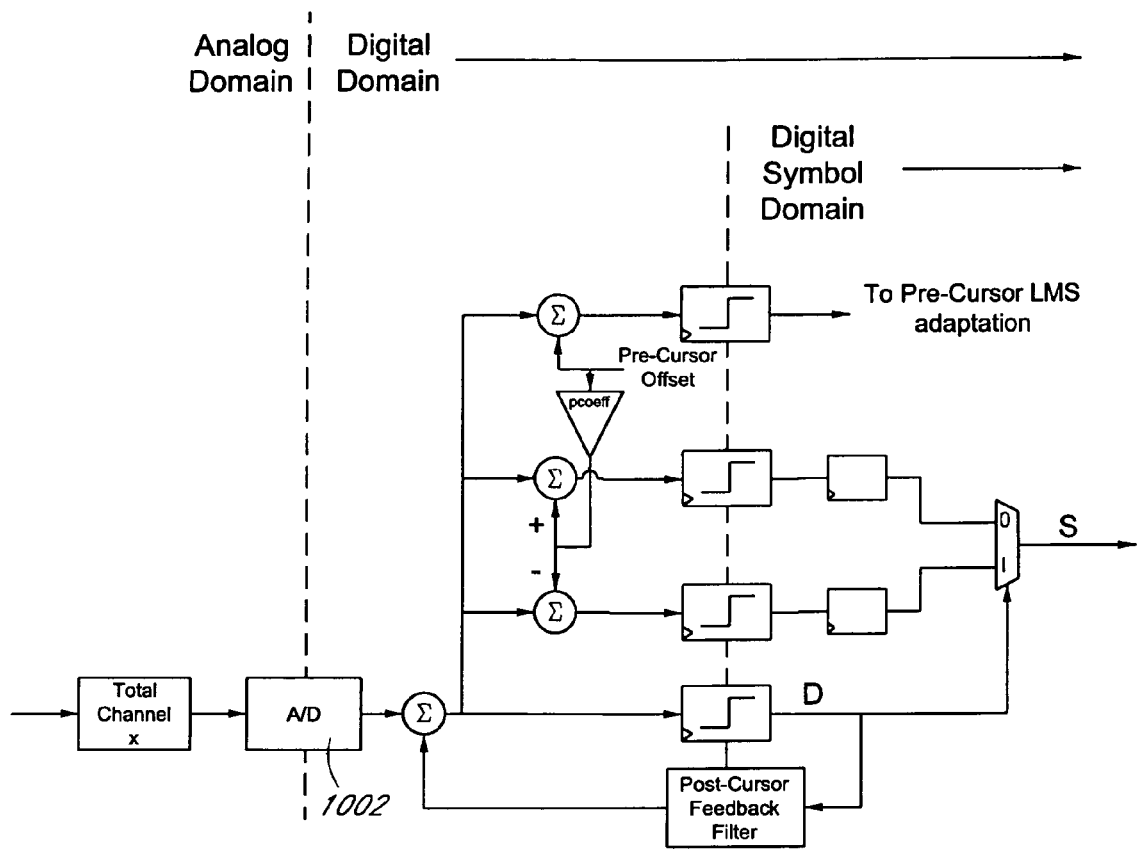
FIG. 10 illustrates an embodiment of a circuit for compensating for pre-cursor inter-symbol interference (ISI) implemented with digital signal processing (DSP).

While previously described in connection with a combination of analog and digital circuit techniques, FIG. 10 illustrates an embodiment of the circuit using DSP techniques. One disadvantage to such DSP techniques is that a relatively fast analog to digital converter 1002 is relatively expensive and consumes a relatively large amount of power.

It should be understand that in a DSP embodiment, the sampling function will typically be performed by the analog to digital converter 1002 and not in a slicer.

The data, after coming through the channel, is converted to a digital signal using the analog to digital converter 1002. In one embodiment, the other operations are implemented using functionally-equivalent digital techniques that will be readily understood by one of ordinary skill in the art. For example, the analog summing circuits can be replaced by digital summing circuits, the slicers by detection of positive or negative numbers, and the like. It will be further understood by the skilled practitioner that various logical blocks can be rearranged, can be combined, and the like, in a wide variety of ways.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of compensating for pre-cursor inter-symbol interference (ISI) in an input signal, where the input signal carries data symbols, the method comprising:
generating a first adjusted version of the input signal in real time, said first adjusted version of the input signal compensating for pre-cursor ISI originating from a subsequent symbol of the input signal when a state of the subsequent symbol corresponds to a first state;
generating a second adjusted version of the input signal in parallel with generating the first adjusted version, said second adjusted version compensating for pre-cursor ISI originating from the subsequent symbol of the input signal when the state of the subsequent symbol corresponds to a second state;
generating a first hard decision output from the first adjusted version of the input signal;
generating a second hard decision output from the second adjusted version of the input signal; and
selecting an output symbol originating from the first hard decision output or the second hard decision output as a pre-cursor ISI-compensated output symbol.

2. The method as defined in claim 1, further comprising:
determining the state of the subsequent symbol of the input signal; and
using the determined state of the subsequent symbol in selecting the output symbol.

3. The method as defined in claim 2, further comprising determining the state of the subsequent symbol of the input signal without using an adjusted version of the input signal.

4. The method as defined in claim 2, wherein the input signal corresponds to non-return to zero (NRZ) signaling.

5. The method as defined in claim 1, further comprising:
receiving data for a plurality of subsequent symbols later-in-time to the output signal;
determining at least one state of at least one of the plurality of subsequent symbols; and
using the at least one determined state of the one or more subsequent symbols to select the output symbol.

6. The method as defined in claim 1, further comprising:
receiving data for a plurality of subsequent symbols later-in-time to the output signal;
generating a third hard decision output from the input signal with substantially no adjustment for pre-cursor ISI offset, where a symbol of the third hard decision output is from at least two symbol cycles later in time to the output signal;

using the third hard decision output to select the first adjusted version or the second adjusted version of the input signal for a first selected symbol from a symbol period one cycle earlier in time to the symbol of the hard decision output; and using the first selected symbol to further select another symbol from a symbol period earlier in time to the first selected symbol.

7. The method as defined in claim 1, further comprising receiving the input signal.

8. The method as defined in claim 1, further comprising:
receiving the input signal; and
removing at least a portion of post-cursor ISI from the input signal prior to generating the first adjusted version and the second adjusted version of the input signal.

9. The method as defined in claim 1, further comprising:
receiving the input signal;
removing a portion of post-cursor ISI from the input signal prior to generating the first adjusted version and the second adjusted version of the input signal, where the removed portion does not include a component of post-cursor ISI from an immediately prior symbol;
removing a component of post-cursor ISI from the first adjusted version of the input signal, where the component removed corresponds to an immediately prior symbol from the generated first hard decision output;
removing a component of post-cursor ISI from the second adjusted version of the input signal, where the component removed corresponds to an immediately prior symbol from the generated second hard decision output.

10. The method as defined in claim 1, where the data symbols are binary, and where the second state is a binary complement to the first state.

11. The method as defined in claim 1, further comprising:
summing the input signal with a first offset to generate the first adjusted version of the input signal; and
summing the input signal with a second offset to generate the second adjusted version of the input signal.

12. The method as defined in claim 11, further comprising adaptively adjusting the first offset and the second offset at least partially in response to observed pre-cursor ISI characteristics.

13. The method as defined in claim 11, further comprising:
adaptively determining a magnitude for an offset corresponding to compensation for pre-cursor ISI; and
scaling the adaptively-determined offset with a fraction greater than 0 and less than 1 for the magnitude of the first offset and the second offset.

14. The method as defined in claim 13, further comprising scaling to a predetermined fraction.

15. The method as defined in claim 11, where the second offset is substantially equal in magnitude to, but opposite in polarity to the first offset.

16. The method as defined in claim 1, further comprising:
receiving the input signal;
removing at least a portion of post-cursor ISI from the input signal;
determining the state of the subsequent symbol of the input signal; and
using the determined state of the subsequent symbol in selecting one of the first hard decision output or the second hard decision output as the pre-cursor ISI-compensated output symbol.

17. A method of canceling pre-cursor inter-symbol interference (ISI) in a signal carrying data symbols, the method comprising:
compensating for pre-cursor ISI in a received signal before ascertaining a logical state of a later-in-time symbol corresponding to the pre-cursor ISI by compensating for pre-cursor ISI for multiple possible logical states of the later-in-time symbol in separate data paths;
determining the logical state of the later-in-time symbol; and
selecting the data path corresponding to the determined logical state of the later-in-time symbol.

18. The method as defined in claim 17, wherein the multiple possible logical states comprises two logical states.

19. The method as defined in claim 17, wherein the method is embodied in a serializer/deserializer (SerDes).

20. A circuit for compensating for pre-cursor inter-symbol interference (ISI) in a signal carrying data symbols, the circuit comprising:
at least a first data processing path and a second data processing path, where the first data processing path and the second data processing path are each coupled directly or indirectly to the signal, where the first data processing path is configured to apply a positive offset to the signal to generate a first pre-cursor ISI compensated data symbol, and where the second data processing path is configured to apply a negative offset to the signal to generate a second pre-cursor ISI compensated data symbol; and
a selection circuit in communication with the first data processing path and with the second data processing path, where the selection circuit is configured to select among at least the first pre-cursor ISI compensated data symbol or the second pre-cursor ISI compensated data symbol for an output symbol compensated for pre-cursor ISI.

21. The circuit as defined in claim 20, wherein:
the first data processing path comprises:
a first summing circuit coupled to the signal, wherein the first summing circuit is configured to combine the signal with a first offset to generate a first modified signal;
a first slicer in communication with the first summing circuit, where the slicer is configured to generate a hard decision output from the first modified signal;
a first delay circuit in communication with the first slicer, where the first delay circuit is configured to delay the hard decision output of the first slicer to generate the first pre-cursor ISI compensated data symbol;
and, the second data processing path comprises:
a second summing circuit coupled to the signal, wherein the second summing circuit is configured to combine the signal with a second offset to generate a second modified signal;
a second slicer in communication with the second summing circuit, where the slicer is configured to generate a hard decision output from the second modified signal; and
a second delay circuit in communication with the second slicer, where the second delay circuit is configured to delay the hard decision output of the second slicer to generate the second pre-cursor ISI compensated data symbol.

22. The circuit as defined in claim 20, wherein the selection circuit comprises a multiplexer.

23. The circuit as defined in claim 20, wherein the selection circuit comprises a multiplexer, the circuit further comprising a slicer coupled to the signal, where a hard decision output of the slicer is coupled to the multiplexer for control.

24. The circuit as defined in claim 20, where an output of a summing circuit corresponds to the signal, the circuit further comprising:
the summing circuit with inputs coupled to a received signal and to an output of a feedback filter;
a slicer in communication with the summing circuit, where the slicer is configured to generate a hard decision output from the signal; and
the feedback filter coupled to the hard decision output of the slicer and configured to generate post-cursor ISI terms for cancellation of post-cursor ISI by the summing circuit.

25. The circuit as defined in claim 20, further comprising:
a summing circuit with inputs coupled to the signal and to a pre-cursor offset;
a slicer in communication with the summing circuit, where the slicer is configured to generate a hard decision output from an output of the summing circuit; and
an adaptation circuit in communication with the slicer, the adaptation circuit configured to vary the pre-cursor offset at least partially in response to observed data from the slicer.

26. The circuit as defined in claim 25, further comprising a scaling circuit configured to scale a magnitude of the first offset and the second offset to a fraction greater than 0 and less than 1 of the magnitude of the pre-cursor offset.

27. The circuit as defined in claim 20, wherein:
each of the first data processing path and the second data processing path further comprise a plurality of delay stages; and
the selection circuit is in communication, directly or indirectly, with at least the plurality of delay stages such that the selection of the first pre-cursor ISI compensated data symbol or the second pre-cursor ISI compensated data symbol is at least partially based on a plurality of symbols later-in-time than the generated output symbol.

28. The circuit as defined in claim 20, further comprising:
a plurality of delay stages for each of the first data processing path and the second data processing path, wherein each plurality is coupled in series such that at least one data sample with the positive offset and the negative offset is available from each symbol interval later-in-time to the output symbol;
a third data processing path configured to retrieve data symbols from the signal with substantially no offset, wherein an output of the third data processing path is at least two symbol periods later-in-time to the output symbol;
a plurality of multiplexers comprising 2 or more multiplexers, wherein:
data inputs of a first multiplexer are coupled to a delay stage corresponding to a symbol later-in-time than the output symbol, wherein a select input for the first multiplexer is coupled to the output of the third data processing path, and where an output of the first multiplexer is coupled to a select input of another multiplexer of the plurality of multiplexers having inputs corresponding to a symbol earlier in time than the inputs of the first multiplexer; and
wherein data inputs of a second multiplexer are coupled to a delay stage corresponding to a symbol earliest in time within the plurality of delay stages, where an output of the second multiplexer is configured to provide the output symbol, and where a select input of the second multiplexer is coupled to an output of another multiplexer of the plurality of multiplexers having inputs corresponding to a symbol earlier in time than the inputs of the first multiplexer.

29. The circuit as defined in claim 28, wherein the plurality of multiplexers comprises two multiplexers such that the output of the first multiplexer is coupled to the select input of the second multiplexer.

30. The circuit as defined in claim 20, wherein the signal corresponds to an output of a first summing circuit, the circuit further comprising:
the first summing circuit with inputs coupled to a received signal and to a first output of a feedback filter;
a second summing circuit with inputs coupled to the signal and to a second output of the feedback filter;
a slicer in communication with the second summing circuit, where the slicer is configured to generate a hard decision output from an output of the second summing circuit;
the feedback filter coupled to the hard decision output of the slicer and configured to generate the first output and the second output, where the first output includes post-cursor ISI terms except for a post-cursor term from an immediately prior symbol, where the second output includes a post-cursor ISI term from the immediately prior symbol; and
where the first data processing path and the second data processing path each include a decision feedback equalizer configured to compensate for post-cursor ISI from the immediately prior symbol corresponding to each data processing path.

31. The circuit as defined in claim 20, wherein the circuit is embodied in a serializer/deserializer (SerDes).

32. A circuit for compensating for pre-cursor inter-symbol interference (ISI) in an input signal, where the input signal carries data symbols, the circuit comprising:
means for generating a first adjusted version of the input signal in real time, said first adjusted version of the input signal compensating for pre-cursor ISI originating from a subsequent symbol of the input signal when a state of the subsequent symbol corresponds to a first state;
means for generating a second adjusted version of the input signal, said second adjusted version compensating for pre-cursor ISI originating from the subsequent symbol of the input signal when the state of the subsequent symbol corresponds to a second state;
means for generating a first hard decision output from the first adjusted version of the input signal;
means for generating a second hard decision output from the second adjusted version of the input signal; and
means for selecting the first hard decision output or the second hard decision output as a pre-cursor ISI-compensated output symbol.

33. The circuit as defined in claim 32, further comprising:
means for determining the state of the subsequent symbol; and
wherein the means for selecting is configured to use the determined state to select the one of the first hard decision output or the second hard decision output.

34. The circuit as defined in claim 32, further comprising means for removing at least a portion of post-cursor ISI from the input signal.

35. The circuit as defined in claim 32, further comprising:
   means for receiving data for a plurality of subsequent symbols later-in-time to the output signal;
   means for determining at least one state at least one of the plurality of subsequent symbols; and
   means for using the at least one determined state of the one or more subsequent symbols to select the output symbol.

36. A circuit for canceling pre-cursor inter-symbol interference (ISI) in a signal carrying data symbols, the circuit comprising:
   means for compensating for pre-cursor ISI in a received signal before ascertaining a logical state of a later-in-time symbol corresponding to the pre-cursor ISI by compensating for pre-cursor ISI for multiple possible logical states of the later-in-time symbol in separate data paths;
   means for determining the logical state of the later-in-time symbol; and
   means for selecting the data path corresponding to the determined logical state of the later-in-time symbol.

37. The circuit as defined in claim 36, wherein the circuit is embodied in a serializer/deserializer (SerDes).

* * * * *